(No Model.)
R. A. LINDSAY.
LIVE BOX FOR FISH.
No. 292,123. Patented Jan. 15, 1884.
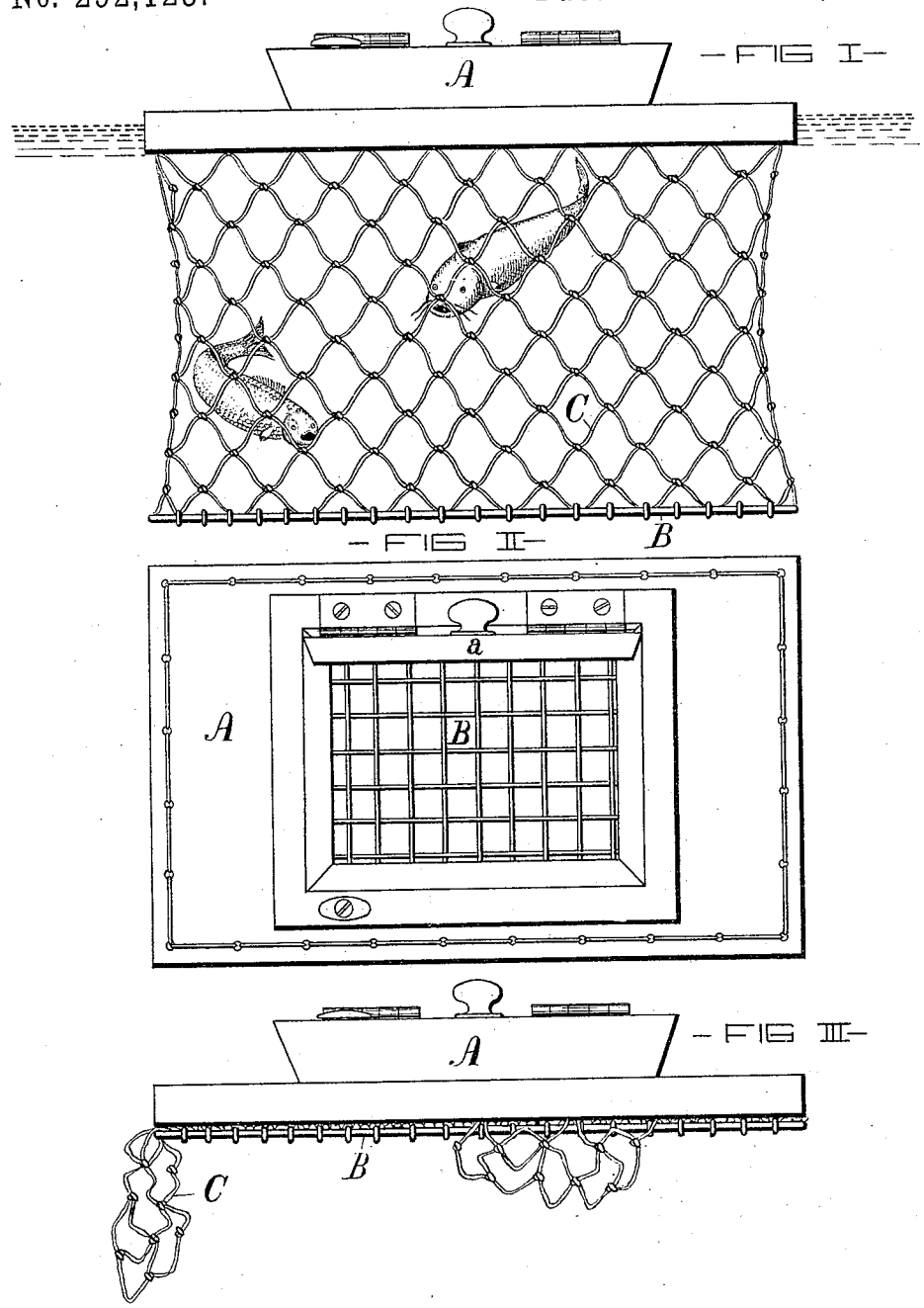

UNITED STATES PATENT OFFICE.

RICHARD A. LINDSAY, OF BALTIMORE, MARYLAND.

LIVE-BOX FOR FISH.

SPECIFICATION forming part of Letters Patent No. 292,123, dated January 15, 1884.

Application filed September 6, 1883. (No model.)

*To all whom it may concern:*

Be it known that I, RICHARD A. LINDSAY, of the city of Baltimore, and State of Maryland, have invented certain improvements in Live-Boxes for Fish, of which the following is a specification.

This invention consists in the combination, in a live-box, of a rigid buoyant top having an opening for the introduction of fish and a hinged door to close the said opening, a non-buoyant bottom, and cord-netting sides, which admit of the top and bottom being brought closely together, so that the device will occupy a greatly reduced space in transportation.

In the drawings forming a part hereof, Figure I is a side view of the improved live-box as it would appear when in use. Fig. II is a plan of the invention with the door open. Fig. III is a view of the device folded.

Similar letters of reference indicate similar parts in all the views.

A is the top of the box, preferably formed of wood, having an opening therein for the introduction of fish, and a hinged door, $a$, as is usual.

B is a perforate bottom, preferably made of wire-work; but it may be constructed of perforate or imperforate sheet metal, if desired.

C is the cord-netting which constitutes the sides of the box.

I claim as my invention—

In a fisherman's live-box, the combination of a rigid buoyant top having an opening for the introduction of fish and a hinged door to close the said opening, a rigid non-buoyant bottom, and cord-netting sides, substantially as and for the purpose specified.

RICHARD A. LINDSAY.

Witnesses:
   WM. T. HOWARD,
   AMERICUS GILL.